(12) United States Patent
Hirota

(10) Patent No.: US 8,640,306 B2
(45) Date of Patent: Feb. 4, 2014

(54) HINGE DEVICE

(75) Inventor: Hideyuki Hirota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/389,865

(22) PCT Filed: Nov. 16, 2009

(86) PCT No.: PCT/JP2009/006111
§ 371 (c)(1),
(2), (4) Date: Feb. 10, 2012

(87) PCT Pub. No.: WO2011/058615
PCT Pub. Date: May 19, 2011

(65) Prior Publication Data
US 2012/0137470 A1    Jun. 7, 2012

(51) Int. Cl.
*E05D 11/08*    (2006.01)
*E05D 11/10*    (2006.01)

(52) U.S. Cl.
USPC .......................... 16/334; 16/319; 361/679.27

(58) Field of Classification Search
USPC ........... 16/357, 360, 334, 335, 344, 321, 340; 361/679.27; 248/917, 176.1, 371, 201, 248/923, 274.1, 284.1, 922, 324, 323, 317
See application file for complete search history.

(56) References Cited

U.S. PATENT DOCUMENTS

| 246,364 | A | * | 8/1881 | Birkmann | 217/60 R |
| 4,485,524 | A | * | 12/1984 | Neville | 16/241 |
| 4,953,259 | A | * | 9/1990 | Frye et al. | 16/225 |
| 6,018,847 | A | * | 2/2000 | Lu | 16/337 |
| 6,644,611 | B1 | * | 11/2003 | Tai | 248/292.13 |
| 7,021,728 | B2 | * | 4/2006 | Donovan et al. | 312/7.2 |
| 7,380,313 | B2 | * | 6/2008 | Akiyama et al. | 16/367 |
| 7,508,656 | B2 | * | 3/2009 | Okahara | 361/679.27 |
| 7,520,024 | B2 | * | 4/2009 | Wang | 16/321 |
| 7,548,414 | B2 | * | 6/2009 | Hung | 361/679.27 |
| 7,641,163 | B2 | * | 1/2010 | O'Keene | 248/292.14 |
| 7,644,473 | B2 | * | 1/2010 | Chen et al. | 16/340 |
| 7,684,175 | B2 | * | 3/2010 | Takao | 361/679.01 |
| 7,698,784 | B2 | * | 4/2010 | Hsu et al. | 16/337 |
| 7,975,350 | B2 | * | 7/2011 | Nagami | 16/367 |
| 8,020,826 | B2 | * | 9/2011 | Zhou | 248/317 |
| 8,059,215 | B2 | * | 11/2011 | Ikunami | 348/837 |
| 8,074,956 | B2 | * | 12/2011 | Wang et al. | 248/688 |

(Continued)

FOREIGN PATENT DOCUMENTS

| JP | 63-105956 U | 7/1988 |
| JP | 4-111035 U | 9/1992 |

(Continued)

*Primary Examiner* — Victor Batson
*Assistant Examiner* — Jason W San
(74) *Attorney, Agent, or Firm* — Birch, Stewart, Kolasch & Birch, LLP

(57) ABSTRACT

A hinge device 100 includes: a one-piece hinge base 20 such that connecting hinge bases 21a, 21b in which rotational shaft portions 23a, 23b are protrusively provided in the same direction by a burring process are connected together through a hinge base connecting part 22; and a one-piece holder 10 such that connecting holders 11a, 11b having click washers 30a, 30b attached thereto are connected together through a holder connecting part 12, wherein the one-piece holder 10 is assembled to the one-piece hinge base 20 from one direction.

10 Claims, 4 Drawing Sheets

(56) References Cited

U.S. PATENT DOCUMENTS

| | | | |
|---|---|---|---|
| 8,230,553 B2* | 7/2012 | Degner et al. | 16/334 |
| 8,302,925 B2* | 11/2012 | Ikunami | 248/324 |
| 8,307,507 B2* | 11/2012 | Wang et al. | 16/334 |
| 2002/0174519 A1* | 11/2002 | Huang | 16/319 |
| 2005/0108854 A1* | 5/2005 | Lee et al. | 16/340 |
| 2006/0124816 A1* | 6/2006 | Okahara | 248/324 |
| 2007/0136995 A1* | 6/2007 | Hu et al. | 16/340 |
| 2007/0163081 A1* | 7/2007 | Lu et al. | 16/330 |
| 2007/0169313 A1* | 7/2007 | Chen et al. | 16/340 |
| 2007/0283533 A1* | 12/2007 | Wang | 16/337 |
| 2008/0007906 A1* | 1/2008 | Hsu et al. | 361/682 |
| 2008/0034543 A1* | 2/2008 | Hsu et al. | 16/346 |
| 2008/0168622 A1* | 7/2008 | Hsu | 16/319 |
| 2009/0015731 A1* | 1/2009 | Nagami | 348/837 |
| 2009/0115927 A1* | 5/2009 | Chang | 349/58 |
| 2010/0128458 A1* | 5/2010 | Nagami | 361/825 |
| 2012/0137470 A1* | 6/2012 | Hirota | 16/342 |

FOREIGN PATENT DOCUMENTS

| | | |
|---|---|---|
| JP | H05-010323 A | 1/1993 |
| JP | 2003-086965 | 3/2003 |
| JP | 2006-105275 A | 4/2006 |
| JP | 2006-168402 A | 6/2006 |
| WO | WO 2008146428 A1 * | 12/2008 |

* cited by examiner

US 8,640,306 B2

HINGE DEVICE

TECHNICAL FIELD

The present invention relates to a hinge device used for an fold/unfold apparatus where a fold/unfold body such as a display is folded and unfolded.

BACKGROUND ART

In a fold/unfold apparatus such as a fold/unfold type of display apparatus, a hinge device is employed for folding and unfolding a fold/unfold (foldable) body such as a display (for example, see Patent Documents 1 and 2). The hinge device disclosed in Patent Document 1 is composed of a left and a right hinge unit attached to both left and right sides of a display, respectively, and the hinge unit is composed of five components (bracket, shaft, click washer, spring plate, and plain washer) on one side of the units. The brackets are attached to a display apparatus main body, the shaft is passed through the bracket, and the display is attached to the tip of the shaft. The click washer is pinched between the bracket and the display. Further, the other tip of the shaft is also protruded from the face of the bracket opposite to the display, and the tip portion of the bracket is fit in a spring plate and a plain washer. The shaft has a complicated configuration for the assembly of the components.

Moreover, one of the opposite faces of the click washer and the display is provided with a recess, while the other thereof is provided with a projection; when the display is folded or unfolded, the recess and projection engage with each other to thereby hold the display at a predetermined fold/unfold angular position.

PRIOR ART DOCUMENTS

Patent Documents

Patent Document 1: JP-A-2006-168402
Patent Document 2: JP-A-2006-105275

SUMMARY OF THE INVENTION

Since the conventional hinge device is arranged as discussed above, the left and right hinge units are separate from each other, and thus the variations between the left and right sides are easily produced. Coming from the variations, there is a problem such that the rotational misalignments and the variations of fold/unfold loads between the left and right sides become large. For example, in the case of the hinge device disclosed in Patent Document 1, when the recess and the projection of the click washer and the blanket engage with each other, the timing where the projection comes in the recess is easily shifted between the left and right hinge units.

Further, there is a problem such that the hinge device uses a lot of components; particularly, the shaft is subjected to a complicated machining process, thus increasing the cost of the device.

The present invention has been made to solve the above-discussed problems, and an object of the invention is to restrain the variations between a left and a right hinge unit when the hinge units are produced and are attached to a fold/unfold body, thereby preventing the rotational misalignments between the left and right sides thereof.

A hinge device in the present invention includes: a pair of hinge units each having a hinge base that has a rotational shaft unit serving as a rotational center shaft, and that is attached to a main body of a fold/unfold apparatus; and a holder that has a rotational shaft hole for passing through the rotational shaft portion, and that is attached to the fold/unfold body to be integrally rotated, wherein the pair of hinge units are arranged such that both hinge bases are connected together through a hinge base connecting part according to a distance between both holders, wherein the hinge unit includes a click washer located between the hinge base and the holder, passing through the rotational shaft portion, rotated integrally with the holder, and having one of a clicking recess and a clicking projection, wherein the hinge base is provided with the other of the clicking recess and the clicking projection that engages with the one of the clicking recess and the clicking projection of the click washer to produce a clicking action on a circumference centered about the rotational center shaft, wherein the rotational shaft portion is arranged such that the hinge base is protrusively provided by a burring process, wherein the pair of hinge units are arranged such that both holders are connected together through a holder connecting part, and that both rotational shaft portions are protrusively provided on the faces on one directional side of both hinge bases, respectively, and that both holders are assembled to both rotational shaft portions from the one directional side, respectively, and wherein the burring processed portion of the hinge base is swaged to fix the holder, hinge base and click washer.

According to the invention, since the pair of hinge units are arranged such that both hinge bases are connected together through the hinge base connecting part according to the distance between both holders, the variations between the left and right hinge units as the hinge units are produced and are attached to a fold/unfold body can be restrained, thereby preventing the rotational misalignments between the hinge units.

BRIEF DESCRIPTION OF THE DRAWINGS

FIG. 4(a) shows a folded state thereof, and FIG. 4(b) shows a unfolded state thereof.

BEST MODE FOR CARRYING OUT THE INVENTION

In the following, embodiments of the present invention will be discussed with reference to the accompanying drawings to explain the present invention in more detail.

First Embodiment

Figure 1:
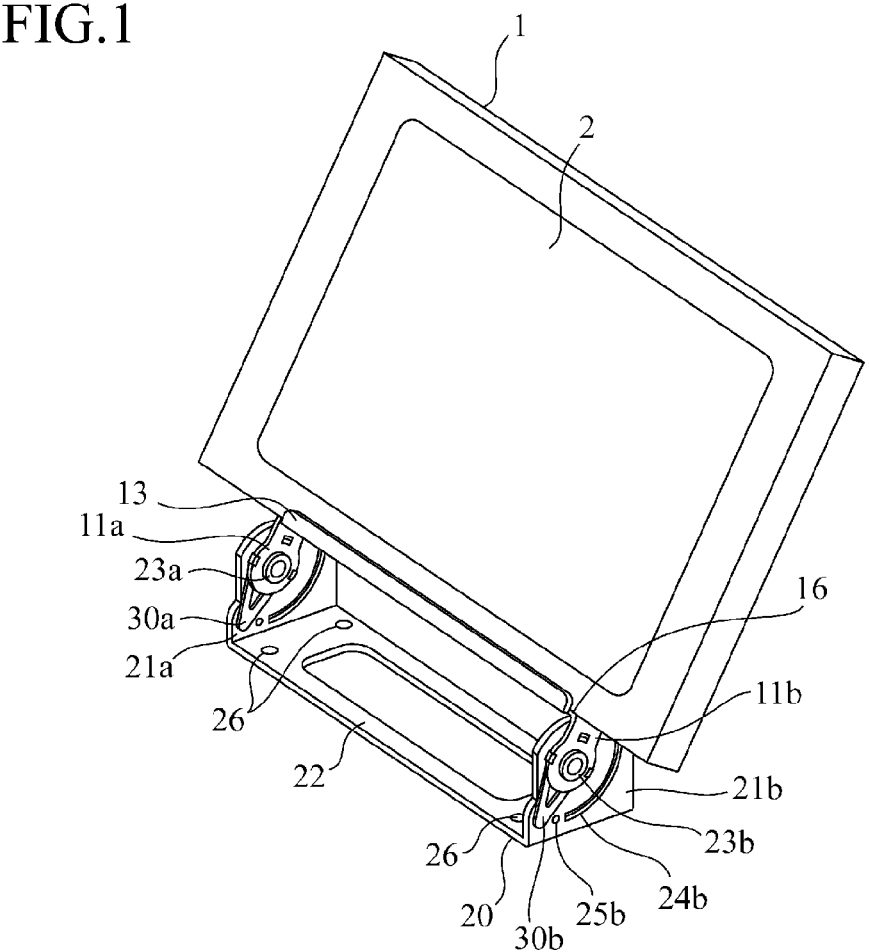
FIG. 1 is a perspective view showing an arrangement of a display to which a hinge device of a first embodiment in the present invention is attached.

In the first embodiment, a hinge device will be discussed with reference to a display apparatus as an example of a fold/unfold (foldable) apparatus where the hinge device is applied. As shown in FIG. 1, a display (fold/unfold body) 1 has a screen 2 on one side thereof, and is rotatably supported by a hinge device 100 in two places of the lower edge thereof. Note that for convenience in explanation, the side of the display 1 having the screen 2 is referred to as the "front," and the left and right with respect to the front are referred to as the "left" and "right" thereof, respectively. However, a display apparatus main body is not depicted in the figures.

Figure 2:
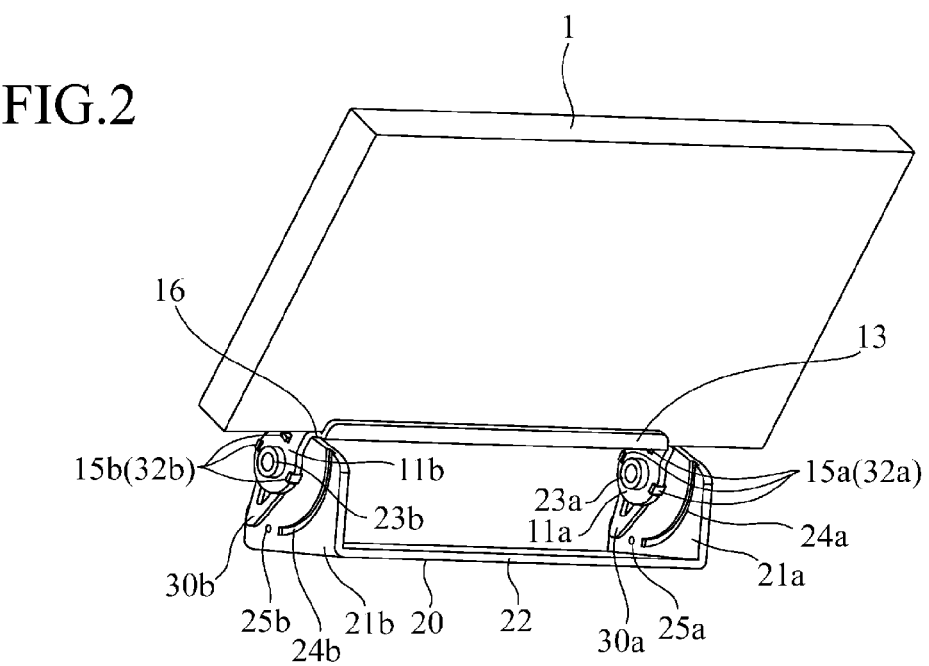
FIG. 2 is a perspective view showing an arrangement of the hinge device where the display shown in FIG. 1 is viewed from the opposite side.
Figure 3:
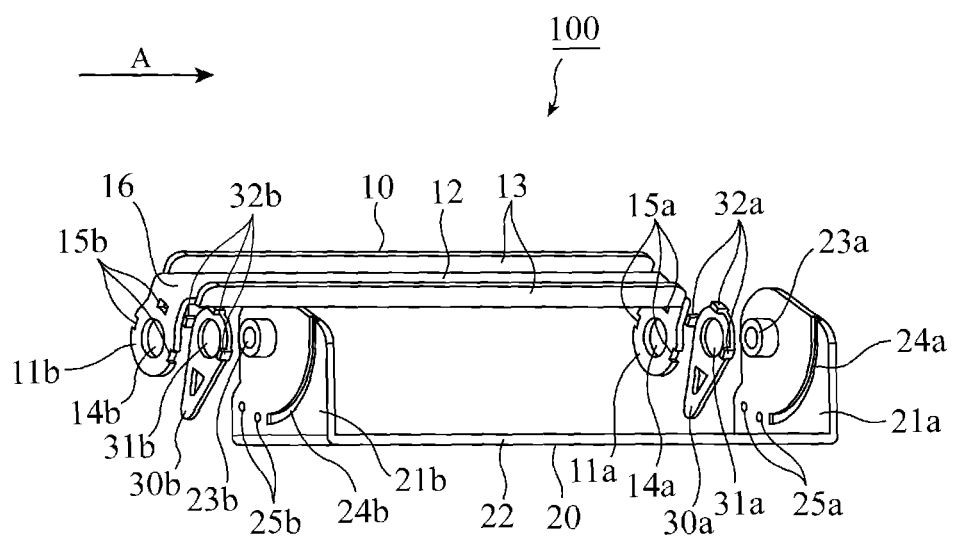
FIG. 3 is an exploded perspective view showing the arrangement of the hinge device of the first embodiment in the invention.

FIG. 3 is an exploded perspective view showing the arrangement of the hinge device 100 as shown in FIG. 2. As shown in FIG. 3, the hinge device 100 is composed of a one-piece holder 10, a one-piece hinge base 20, and two click washers 30a, 30b.

The one-piece holder 10 is composed of a left and a right holder 11a, 11b, and a holder connecting part 12 for connecting the left and right holders 11a, 11b together. The holder connecting part 12 is a member for the attachment of the display 1, and a dislocation-restraining section 13 for preventing the dislocation of the display 1 is formed thereon. However, it may be arranged that the holders 11a, 11b are not integrated with the holder connecting part 12, but the holders 11a, 11b each are attached directly to the lower edge of the display 1 to be integrated. Note that the dislocation-restraining section 13 can be eliminated.

In the left holder 11a, a rotational shaft hole 14a for passing through a rotational shaft portion 23a serving as a rotational center shaft is formed, and also positioning recesses 15a to be integrated with the click washer 30a are formed in three places. The right holder 11b also has a similar construction to the left holder 11a. However, the connecting portion between the right holder 11b and the holder connecting part 12 functions as a stopper 16 for regulating the folding and unfolding operations of the display 1 within the range of a predetermined fold/unfold angle. Since the stopper 16 straddles the hinge base 21b, when the one-piece holder 10 is rotated to a predetermined rotational angular position, the stopper 16 abuts against the hinge base 21b to stop the rotation of the one-piece holder 10, thus restraining the folding and unfolding operations of the display 1.

The one-piece hinge base 20 is composed of a left and a right hinge base 21a, 21b and a hinge base connecting part 22 for connecting the left and right hinge bases 21a, 21b together. The hinge base connecting part 22 also serves as a member for attaching the hinge device 100 containing the display 1 to a display apparatus main body, and has screw holes 26 formed in four places. The hinge device 100 and the main body are fixed to each other when screws are tightened through the screw holes 26. The screw holes 26 and the screws constitute a mounting member. However, a mounting member other than the screws (for example, pegs or adhesive) may be used for the fixation. Moreover, the distance between the hinge bases 21a, 21b in the one-piece hinge base 20, that is, the length of the hinge base connecting part 22 may be determined according to the distance between the holders 11a, 11b of the one-piece holder 10.

A rotational shaft portion 23a serving as a rotational center shaft is formed on the left hinge base 21a, and also a fold/unfold guide groove 24a which engages with a fold/unfold angle fixing projection (not shown) of the click washer 30a and two fold/unfold angle fixing recesses 25a are formed on a circumference centered about the rotational center shaft. The rotational shaft portion 23a is protrusively provided in such a manner that the hinge base 21a is subjected to a burring process (a process making a hole and raising the periphery of the hole). The right hinge base 21b also has a similar construction to the left hinge base 21a. However, the rotational shaft portions 23a, 23b, fold/unfold guide grooves 24a, 24b, and fold/unfold angle fixing recesses 25a, 25b are formed on the faces of the hinge bases 21a, 21b on one directional side (arrow A in FIG. 3), respectively.

The left and right click washers 30a, 30b each serve as a resilient member. In the left click washer 30a, a rotational shaft hole 31a for passing through the rotational shaft portion 23a projecting from the hinge base 21a is formed, and also positioning projections 32a to be engaged with the positioning recesses 15a of the holder 11a are formed in three places. Further, the fold/unfold angle fixing projection (not shown) for holding the attitude of the display 1 is formed so as to be slid with fitting in the fold/unfold guide groove 24a of the hinge base 21a and also engaged with the fold/unfold angle fixing recess 25a. The right click washer 30b also has a similar construction to the left click washer 30a.

However, the fold/unfold angle fixing projections of the click washer 30a, 30b each may be formed in a recess shape, and the fold/unfold guide grooves 24a, 24b of the hinge bases 21a, 21b and that the fold/unfold angle fixing recesses 25a, 25b each may be formed in a projection shape.

Also, the positioning projections 32a, 32b of the click washers 30a, 30b each may be formed in a recess shape, and that the positioning recesses 15a, 15b of the holders 11a, 11b each may be formed in a projection shape.

Next, an assembling method of the hinge device 100 will be described.

The positioning projections 32a, 32b of the click washers 30a, 30b are engaged with the positioning recesses 15a, 15b of the one-piece holder 10 to be integrated, whereby it is arranged that the click washers 30a, 30b are rotated synchronously with the one-piece holder 10. Furthermore, the rotational shaft portions 23a, 23b of the hinge bases 21a, 21b are inserted into the rotational shaft holes 14a, 14b of the one-piece holder 10 integrated with the click washers 30a, 30b from the one directional side (arrow A in FIG. 3), respectively, and then the tips of the rotational shaft portions 23a, 23b are swaged to be fixed. At that time, by the adjustment of the amount of the swaging, a clearance allowing for the rotation of the one-piece hinge base 20 is provided.

Next, the operation of the hinge device 100 will be described.

When the display 1 is pushed to a direction from the folded position shown in FIG. 4(a) to the unfolded direction shown in FIG. 4(b) (arrow B in FIG. 4(a)), the one-piece holder 10 is rotated synchronously with the click washers 30a, 30b about the rotational shaft portions 23a, 23b. During the rotation, the fold/unfold angle fixing projections of the click washers 30a, 30b are slid with fitting in the fold/unfold guide grooves 24a, 24b, respectively. When the display 1 is further pushed, so that the fold/unfold angle fixing projections are fitted in the fold/unfold angle fixing recesses 25a, 25b, respectively, the display 1 is held in the fold/unfold angular position owing to the engagement. However, in the illustrative example, the fold/unfold angle fixing recesses 25a, 25b each are formed in two places, not limited to the two, may be formed by any number of places.

When the display 1 is unfolded to the fold/unfold angular position as shown in FIG. 4(b), the stopper 16 of the one-piece holder 10 abuts against the edge of the hinge base 21b to stop the rotation of the one-piece holder 10. Moreover, the fold/unfold angle fixing recesses 25a, 25b of the one-piece hinge base 20 engage with the fold/unfold angle fixing projections of the click washers 30a, 30b, respectively, to hold the display 1 in the fold/unfold angular position.

Figure 4:
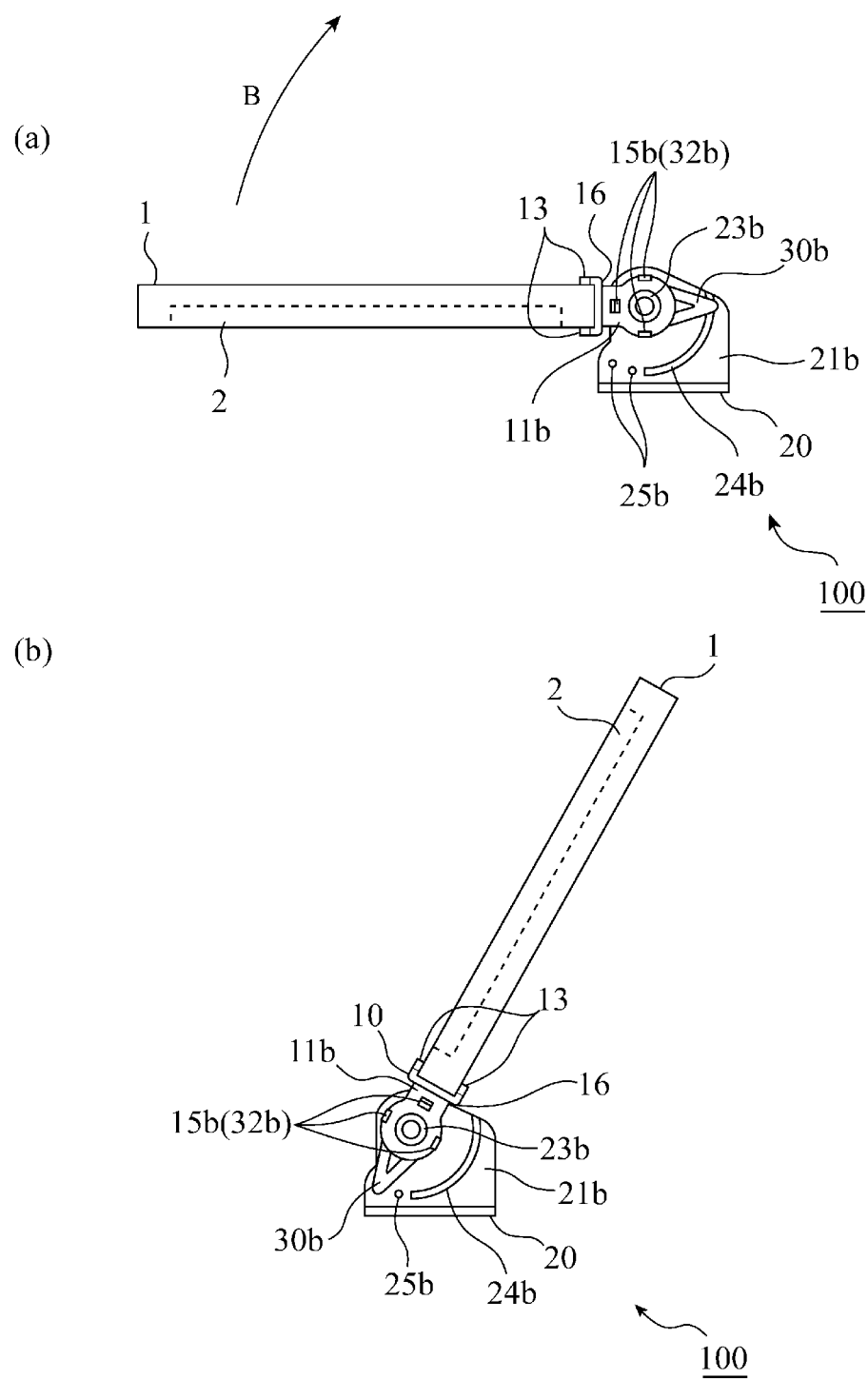
FIG. 4 is a side view showing the arrangement of the display as shown in FIG. 1.

Note that the stopper 16 stops the rotation of the one-piece holder 10 in the unfolding direction to halt the unfolding operation of the display 1, and also stops the rotation of the one-piece holder 10 in the folding direction to halt the holding operation of the display 1. When the display 1 is further pushed from the folded position as shown in FIG. 4(a) in the folding direction of the display (in the opposite direction from the arrow B of FIG. 4 (a)), the stopper 16 abuts against the edge of the hinge base 21b to stop the rotation of the one-piece holder 10.

Hereupon, the combination of the holder 11a, hinge base 21a, and click washer 30a is referred to as a "left hinge unit," and the combination of the holder 11b, hinge base 21b, and click washer 30b is referred to as a "right hinge unit."

Since the hinge device 100 is integrally formed by connecting the left hinge unit with the right hinge unit together through the holder connecting part 12 and the hinge base connecting part 22, the dimensional accuracy of the distances between the holders 11a, 11b, and between the hinge bases 21a, 21b can be enhanced in the assembled situation. Moreover, since the one-piece hinge base 20 is produced such that the distance between the hinge bases 21a, 21b is adapted to the one between the holders 11a, 11b, the misalignments between the left and right hinge units can be restrained in the attachment thereof to the display 1.

Further, when the hinge device 100 is secured to the display apparatus main body, the screw holes 26 are prepared on the hinge base connecting part 22 inside the hinge bases 21a, 21b, the hinge device 100 can be fixed inside the contour of the display 1, which makes it possible to perform space savings. Moreover, the dimensional accuracy of the one-piece holder 10 and the one-piece hinge base 20 is high, and further, in the attachment thereof to the display apparatus, the misalignments between the left and right hinge units can be restrained; as a result, in folding and unfolding the display 1, the timings where the fold/unfold angle fixing projections of the click washers 30a, 30b engage with the fold/unfold angle fixing recesses 25a, 25b of the one-piece hinge base 20, respectively, are not easily shifted from each other between the left and right hinge units, thus preventing the misalignments between the fold/unfold angles of the display 1 on the left and side sides.

As discussed above, according to the first embodiment, the left hinge unit includes: the hinge base 21a that has the rotational shaft portion 23a serving as the rotational center shaft, and that is attached to the display apparatus main body; and the holder 11a that has the rotational shaft hole 14a for passing through the rotational shaft portion 23a, and that is attached to the display 1 to be integrally rotated, while the right hinge unit also includes: the hinge base 21b that has the rotational shaft portion 23b serving as the rotational center shaft, and that is attached to the display apparatus main body; and the holder 11b that has the rotational shaft hole 14b for passing through the rotational shaft portion 23b, and that is attached to the display 1 to be integrally rotated, whereby the left and right hinge units are arranged such that the hinge bases 21a, 21b are connected together through the hinge base connecting part 22 according to the distance between both holders 11a, 11b. Therefore, it is possible to restrain the variations between the left and right hinge units as the hinge device 100 is produced and is attached to the display apparatus to thereby prevent the rotational misalignments between the left and right hinge units, more specifically, the misalignments where the fold/unfold angle fixing recesses 25a, 25b of the one-piece hinge base 20 engage with the fold/unfold angle fixing projections of the click washers 30a, 30b, respectively.

Further, according to the first embodiment, it is schemed that the rotational shaft units 23a, 23b are protrusively provided in such a manner that the hinge bases 21a, 21b are subjected to the burring process. Therefore, the rotational shaft portions 23a, 23b can be formed integral with the hinge bases 21a, 21b, and the process of the rotational shaft portions 23a, 23b can be simplified. Consequently, the cost reduction becomes possible.

Moreover, according to the first embodiment, the left and right hinge units are arranged such that both holders 11a, 11b are connected together through the holder connecting part 12, both rotational shaft portions 23a, 23b are protruded from the faces of the hinge bases 21a, 21b on the one directional side, respectively, and both holders 11a, 11b are assembled to both rotational shaft portions 23a, 23b from the one directional side, respectively. Therefore, the assembly can be performed from the one directional side, thus enhancing the assemblability of the holders.

Further, according to the first embodiment, the one-piece holder 10 is arranged to have the stopper 16 such that when the one-piece holder 10 is rotated to a predetermined rotational angular position, it abuts against the one-piece hinge base 20 to halt the folding/unholding of the display 1. Consequently, the one-piece holder 10 itself can prevent the display 1 from being unfolded to excess.

Besides, according to the first embodiment, it is arranged that the screw holes 26 are formed inside between the two hinge bases 21a, 21b, and that the hinge base connecting part 22 is screwed to the display apparatus main body. Therefore, the screwing can be performed inside the contour of the display, which makes it possible to perform space savings.

Hereupon, in the first embodiment, a display apparatus is shown as an example of a fold/unfold apparatus where the hinge device is applied, which is not limited to this, and it is needless to say that the hinge device can be applied to any apparatus so long as the apparatus includes a fold/unfold body or a rotational body that is supported in two places of left and right to be folded and unfolded, or rotated.

Figure 5:
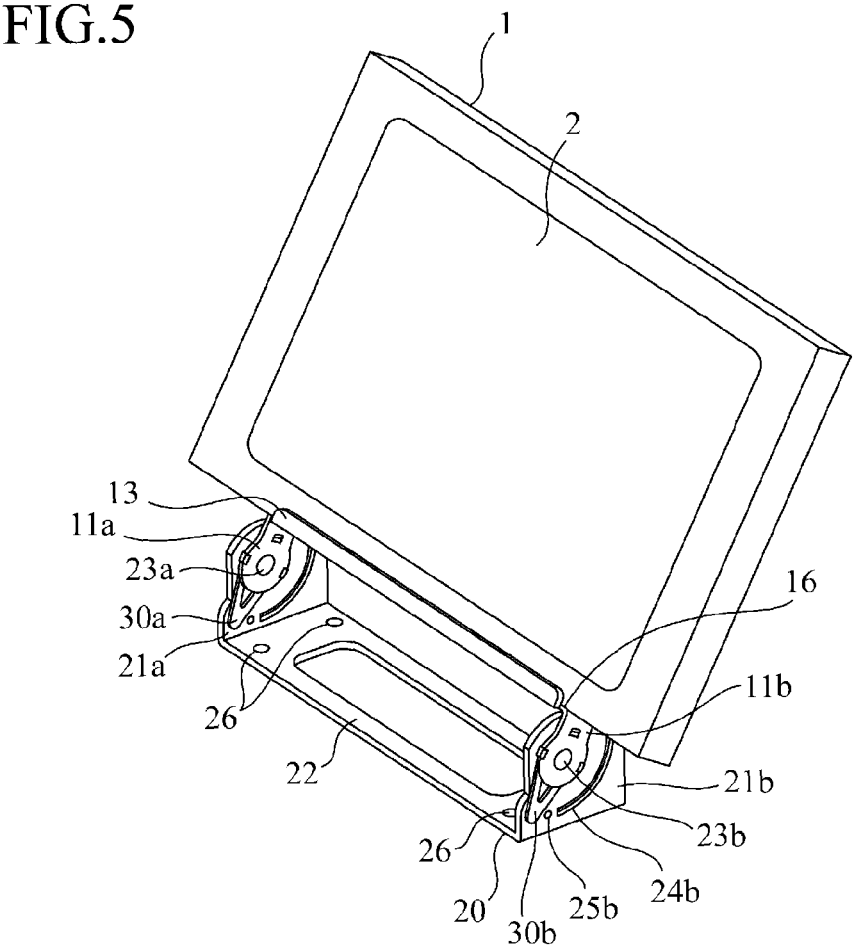
FIG. 5 is a perspective view showing a modification of the hinge device of the first embodiment in the invention.
Figure 6:
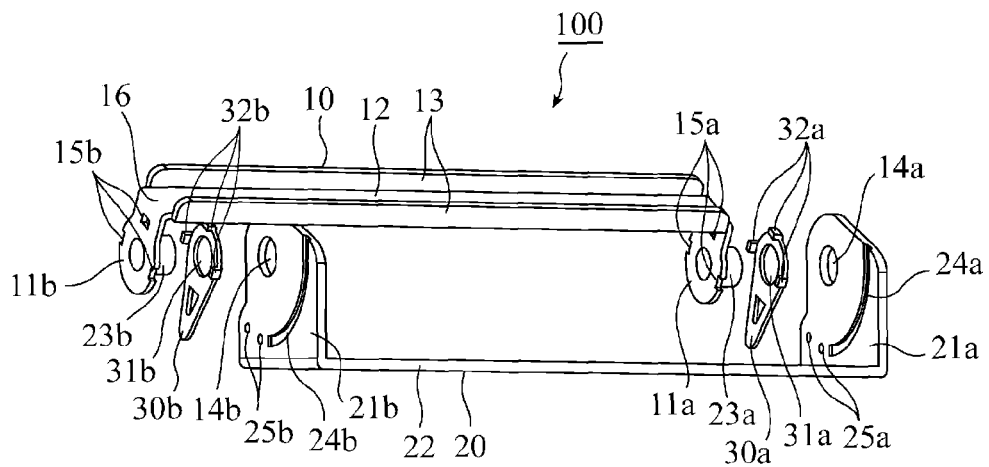
FIG. 6 is an exploded perspective view showing an arrangement of the hinge device as shown in FIG. 5.

Further, in the first embodiment, the hinge bases 21a, 21b are subjected to a burring process to protrusively provide the rotational shaft portions 23a, 23b, respectively, which is not limited to this; as in the modification shown in FIG. 5 and FIG. 6, the holders 11a, 11b may be subjected to the burring process to protrusively provide the rotational shaft portions 23a, 23b thereon, respectively. In such a configuration, the rotational shaft holes 14a, 14b are formed in the hinge bases 21a, 21b, respectively.

INDUSTRIAL APPLICABILITY

As discussed above, the hinge device of the present invention includes: a one-piece hinge base such that left and right hinge bases in which left and right rotational shaft portions are protrusively provided in the same direction by a burring process are formed in one piece; and a one-piece holder such that left and right holders having left and right click washers attached thereto are formed in one piece, wherein the one-piece holder is assembled to the one-piece hinge base from one direction. Thus, the hinge device is suitable for use in a fold/unfold apparatus or the like.

The invention claimed is:

1. A hinge device attached to a fold/unfold apparatus where said device has a fold/unfold body making folding and unfolding operations about a rotational center shaft with respect to a main body, comprising:
   a pair of hinge units each including:
      a hinge base that has a rotational shaft portion serving as a rotational center shaft, and that is attached to the main body of the fold/unfold apparatus; and
      a holder that has a rotational shaft hole through which the rotational shaft portion passes, and that is attached to the fold/unfold body to be integrally rotated, wherein the pair of hinge units are arranged such that both hinge bases are connected together through a hinge base connecting part according to a distance between both holders, wherein the holders of the pair of hinges are attached to the fold/unfold body in such manner that each said rotational shaft portion is disposed in fixed relation with a bottom edge of said fold/unfold body, and provides an axis of rotation about which said fold/unfold body is rotatable a range of at least 90 degrees with respect to the main body, wherein each of the pair of hinge units includes a click washer located between the hinge base and the holder, through which the rotational shaft portion passes, rotated integrally with the holder, and having one of a clicking recess and a clicking projection, wherein the hinge base is provided with the other of the clicking recess and the clicking projection that engages with the one of the clicking recess and the clicking projection of the click washer to produce a clicking action on a circumference centered about the rotational center shaft, wherein the rotational shaft portion is arranged such that the hinge base is protrusively provided by a burring process, wherein the pair of hinge units are arranged such that both holders are connected together through a holder connecting part, and that both rotational shaft portions are protrusively provided on the faces on one same directional side of both hinge bases, respectively, and that both holders are assembled to both rotational shaft portions from the one directional side, respectively, and wherein the burring processed portion of the hinge base is swaged to fix the holder, hinge base and click washer.

2. The hinge device according to claim 1, wherein the holder has a stopper that abuts against the hinge base to restrain the folding and unfolding of the fold/unfold body, when the holder is rotated to a predetermined rotational angular position.

3. The hinge device according to claim 1, wherein the hinge device has a mounting member that is located between both hinge bases, and that secures the hinge base connecting part to the fold/unfold apparatus.

4. A hinge device attached to a fold/unfold apparatus where said device has a fold/unfold body making folding and unfolding operations about a rotational center shaft with respect to a main body, comprising:

a pair of hinge units each including:
  a holder that has a rotational shaft portion serving as a rotational center shaft, and is attached to the fold/unfold body to be integrally rotated; and
  a hinge base that has a rotational shaft hole through which the rotational shaft portion passes, and is attached to the main body of the fold/unfold apparatus, wherein the pair of hinge units are arranged such that both hinge bases are connected together through a hinge base connecting part according to a distance between both holders, wherein the holders of the pair of hinges are attached to the fold/unfold body in such manner that each said rotational shaft portion is disposed in fixed relation with a bottom edge of said fold/unfold body, and provides an axis of rotation about which said fold/unfold body is rotatable a range of at least 90 degrees with respect to the main body, wherein each of the pair of hinge units includes a click washer located between the hinge base and the holder, through which the rotational shaft portion passes, rotated integrally with the holder, and having one of a clicking recess and a clicking projection, wherein the hinge base is provided with the other of the clicking recess and the clicking projection that engages with the one of the clicking recess and the clicking projection of the click washer to produce a clicking action on a circumference centered about the rotational shaft hole, wherein the rotational shaft portion is arranged such that the holder is protrusively provided by a burring process, wherein the pair of hinge units are arranged such that both holders are connected together through a holder connecting part, and that both rotational shaft portions are protrusively provided on the faces on one same directional side of both holders, respectively, and that both holders are assembled to both hinge bases from the one directional side, respectively, and wherein the burring processed portion of the holder is swaged to fix the holder, hinge base and click washer.

5. The hinge device according to claim 4, wherein the holder has a stopper that abuts against the hinge base to restrain the folding and unfolding of the fold/unfold body when the holder is rotated to a predetermined rotational angular position.

6. The hinge device according to claim 4, wherein the hinge device has a mounting member that is located between both hinge bases, and that secures the hinge base connecting part to the fold/unfold apparatus.

7. The hinge device according to claim 1, further comprising:
  dislocation-restraining sections that extend upwardly from two end positions of the holder connection part, respectively, to prevent dislocation of the fold/unfold body.

8. The hinge device according to claim 4, further comprising:
  dislocation-restraining sections that extend upwardly from two end positions of the holder connection part, respectively, to prevent dislocation of the fold/unfold body.

9. The hinge device according to claim 1, wherein
the hinge base of each of the pair of hinge units is provided with a guide groove to which the one of the clicking recess and the clicking projection of the click washer engages, the guide groove being provided on a circumference on which the other of the clicking recess and the clicking projection is provided.

10. The hinge device according to claim 4, wherein
the hinge base of each of the pair of hinge units is provided with a guide groove to which the one of the clicking recess and the clicking projection of the click washer engages, the guide groove being provided on a circumference on which the other of the clicking recess and the clicking projection is provided.

* * * * *